US012659160B2

(12) United States Patent
Hwang

(10) Patent No.:　US 12,659,160 B2
(45) Date of Patent:　Jun. 16, 2026

(54) ONE-ROUND ASYMMETRIC PASSWORD-BASED AUTHENTICATION AND KEY SHARING METHOD WITH RESILIENCE TO PRE-COMPUTATION ATTACKS

(71) Applicant: SUNGSHIN WOMEN'S UNIVERSITY INDUSTRY-ACADEMIC COOPERATION FOUNDATION, Seoul (KR)

(72) Inventor: Jung Yeon Hwang, Daejeon (KR)

(73) Assignee: SUNGSHIN WOMEN'S UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 172 days.

(21) Appl. No.: 18/438,637

(22) Filed: Feb. 12, 2024

(65) Prior Publication Data

US 2025/0184145 A1　Jun. 5, 2025

(30) Foreign Application Priority Data

Nov. 30, 2023　(KR) ........................ 10-2023-0171108

(51) Int. Cl.
*H04L 9/32*　(2006.01)
*H04L 9/08*　(2006.01)

(52) U.S. Cl.
CPC ............ *H04L 9/3226* (2013.01); *H04L 9/085* (2013.01); *H04L 9/0869* (2013.01); *H04L 9/3242* (2013.01)

(58) Field of Classification Search
CPC .................................................... H04L 9/3226
See application file for complete search history.

(56) References Cited

U.S. PATENT DOCUMENTS 6,956,950 B2 * 10/2005　Kausik ................ G06F 21/6245
380/282
10,447,669 B2 * 10/2019　Choi ..................... H04L 63/061
(Continued)

FOREIGN PATENT DOCUMENTS

KR　　　10-0398161 B1　9/2003

OTHER PUBLICATIONS

Ri-Gyo Hwang, et al., "One-round password-based authenticated key exchange with resilience to pre-computation attacks," Paper presentation on Sep. 8, 2023.

*Primary Examiner* — Ponnoreay Pich
(74) *Attorney, Agent, or Firm* — Sughrue Mion, PLLC

(57) ABSTRACT

The invention relates to an one-round password-based authentication and key sharing method with resilience to pre-computation attacks and with communication round efficiency, and the method includes: allowing a client to generate a first hash key, a second hash key, and a random number exponent that is a private salt by using a public parameter and a password and to register the PW-authentication value information including a commitment value generated by the first hash key, the second hash key, and the random number exponent in a server; allowing the client to generate the second hash key by using the password, to generate a client random number exponent, to generate a client temporary public key by using the second hash key and the client random number exponent, and to deliver the client temporary public key to the server; allowing the server to generate a server random number exponent, to generate a ciphertext of a server temporary public key by using the server random number exponent and the PW-authentication value information, and to deliver the ciphertext to the client; allowing the client to generate the first hash key by using the password, to decrypt the ciphertext, and to acquire the server temporary public key; allowing the client to generate the
(Continued)

temporary common key by using the server temporary public key and the client random number exponent; and allowing the server to generate the temporary common key by using the client temporary public key and the server random number exponent.

11 Claims, 4 Drawing Sheets

(56)                References Cited

U.S. PATENT DOCUMENTS

| | | | | |
|---|---|---|---|---|
| 11,626,980 B2 * | 4/2023 | Peddada | ............... | H04L 9/3247 |
| | | | | 713/168 |
| 2017/0126642 A1 * | 5/2017 | Basin | ..................... | H04L 9/302 |
| 2019/0207756 A1 * | 7/2019 | Vass | ..................... | H04L 9/0863 |
| 2025/0184145 A1 * | 6/2025 | Hwang | .................. | H04L 9/085 |

* cited by examiner

FIG. 3

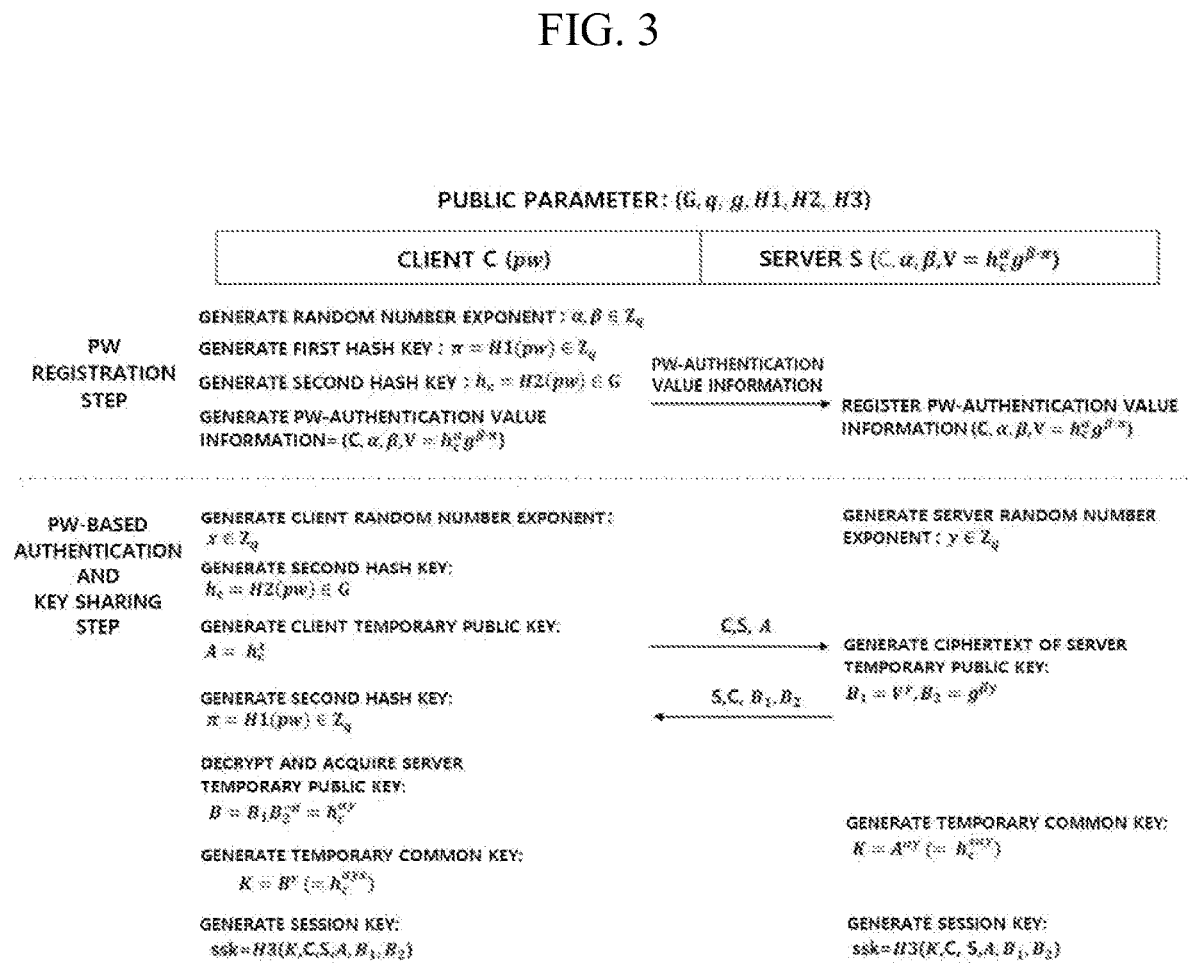

PUBLIC PARAMETER: $(G, q, g, H1, H2, H3)$

| CLIENT C $(pw)$ | SERVER S $(C, \alpha, \beta, V = h_c^\alpha g^{\beta \cdot \pi})$ |
|---|---|

PW REGISTRATION STEP

GENERATE RANDOM NUMBER EXPONENT : $\alpha, \beta \in \mathbb{Z}_q$

GENERATE FIRST HASH KEY : $\pi = H1(pw) \in \mathbb{Z}_q$

GENERATE SECOND HASH KEY : $h_c = H2(pw) \in G$

GENERATE PW-AUTHENTICATION VALUE INFORMATION= $(C, \alpha, \beta, V = h_c^\alpha g^{\beta \cdot \pi})$

PW-AUTHENTICATION VALUE INFORMATION →

REGISTER PW-AUTHENTICATION VALUE INFORMATION $(C, \alpha, \beta, V = h_c^\alpha g^{\beta \cdot \pi})$

---

PW-BASED AUTHENTICATION AND KEY SHARING STEP

CLIENT:

GENERATE CLIENT RANDOM NUMBER EXPONENT: $x \in \mathbb{Z}_q$

GENERATE SECOND HASH KEY: $h_c = H2(pw) \in G$

GENERATE CLIENT TEMPORARY PUBLIC KEY: $A = h_c^x$ $\xrightarrow{C, S, A}$

GENERATE SECOND HASH KEY: $\pi = H1(pw) \in \mathbb{Z}_q$ $\xleftarrow{S, C, B_1, B_2}$ DECRYPT AND ACQUIRE SERVER TEMPORARY PUBLIC KEY: $B = B_1 B_2^{-\pi} = h_c^{\alpha y}$ GENERATE TEMPORARY COMMON KEY: $K = B^x \ (= h_c^{\alpha x y})$ GENERATE SESSION KEY: $ssk = H3(K, C, S, A, B_1, B_2)$

SERVER:

GENERATE SERVER RANDOM NUMBER EXPONENT: $y \in \mathbb{Z}_q$

GENERATE CIPHERTEXT OF SERVER TEMPORARY PUBLIC KEY: $B_1 = V^y, B_2 = g^{\beta y}$ GENERATE TEMPORARY COMMON KEY: $K = A^{\alpha y} \ (= h_c^{\alpha x y})$ GENERATE SESSION KEY: $ssk = H3(K, C, S, A, B_1, B_2)$

ONE-ROUND ASYMMETRIC PASSWORD-BASED AUTHENTICATION AND KEY SHARING METHOD WITH RESILIENCE TO PRE-COMPUTATION ATTACKS

CROSS-REFERENCE TO RELATED APPLICATION

This application is based upon and claims the benefit of priority from Korean Patent Application No. 2023-0171108, filed Nov. 30, 2023, the entire contents of which are incorporated herein by reference.

TECHNICAL FIELD

The present invention relates to an asymmetric password-based authentication and key sharing method with resilience to pre-computation attacks and with communication round efficiency.

BACKGROUND

Passwords are used as the most common form of authentication on the Internet. In fact, most password authentication methods are used in combination with a widely known TLS/SSL technology, and among these methods, a method by using server's public key is widely known. This method operates as follows. At a registration stage, a hash function value calculated by inputting client's password is stored on a server as a so-called 'password file' as a client verification value. In the subsequent user authentication stage, when the client delivers a ciphertext encrypted with its password by using the server's public key, the server decrypts the received ciphertext to retrieve the password, calculates the verification value, checks whether the verification value is the same as the client verification value registered in advance, and proceeds with client authentication. However, there are known disadvantages of this method, as follows. The first is that, during the login process, the password is displayed to the server in a clear plain text. The second is that, as a well-known and common problem, a TLS channel may be incorrectly set up with the server's public key compromised by malicious attacks or the like. In addition, since a user needs to possess a server's original public key or acquire the server's original public key separately, it is inconvenient to use from the client side.

As an alternative to this, password-only authentication protocols that do not need to rely on external key values such as public keys that have high entropy and are less likely to memorize have been actively researched or developed. In this protocol, the client uses only a memorable password as authentication means, so that authentication can be conveniently performed without the possession of a medium to store a private key. After password-based authentication, a cryptographic key is required to ensure the security of communication messages between intended users. To this end, password-only authentication protocols are typically designed as the PW-based authentication and key exchange (PAKE, Password-Authenticated Key Exchange) protocols that can calculate a shared session key that is cryptographically secure while mutually authenticating each other by using passwords between the client and server.

The PAKE protocol has been proposed in various forms and has been disclosed as the International standard through International Standardization Organizations such as ISO/IEC 11770-4, IEEE P.1363, and IETF. Depending on the method of sharing the passwords, PAKE can be divided into symmetric, asymmetric, and strong asymmetric forms. Both symmetric and asymmetric PAKE protocols have vulnerabilities where clients' passwords are easily exposed to server compromise such as hacking, as follows. In symmetric PAKE, the same password or function value information derived from the password is shared as the authentication means. Typically, in the client-server model, since the server stores and manages the large number of clients' passwords, the server has a vulnerable structure in which the large number of clients' passwords are exposed to compromise to the server such as hacking. To solve these problems of the symmetric PAKE protocol, the asymmetric PAKE protocol has been proposed. In the asymmetric PAKE protocol, the server stores the one-way hash function value of the password, called a password file, as verification information. Even if the server is compromised, the password information is not directly exposed, and the attacker is intended to launch a separate offline dictionary attack on each user to find an original password, that is, an original one-way function value of the password. However, as recently known, since the one-way hash function value is calculated by using fixed parameters or public salts, most asymmetric PAKE protocols that the one-way hash function value are highly vulnerable to pre-computation attacks. In other words, the attacker calculates in advance the dictionary of collection of all information available as the password, one-way function information, and one-way hash function values calculated by using fixed parameters or public salts in the form of a table in advance. When the server is attacked, the user's password can be found immediately. Currently, it is known that most asymmetric PAKES, including International standard PAKE protocols such as ISO/IEC 11770-4 and IEEE P.1363, are vulnerable to pre-computation attacks.

To overcome this problem, strong asymmetric PAKE has been studied or developed. In other words, the asymmetric PAKE protocol that provides robustness to pre-computation attacks has been studied. In principle, the one-way hash function value of the password stored in the server needs to be calculated by using the private salt with randomness generated for each user. This private salt is first revealed to the attacker when the server is compromised, so that a pre-computation table cannot be generated, and thus, password information is not directly exposed. The attacker needs to perform the separate offline dictionary attack for each user to find the original password, that is, the original one-way function value of the password, so that the original one-way function value of the password is robust against password leakage.

The only asymmetric PAKE protocol known at this moment that provides robustness to pre-computation attacks is an OPAQUE protocol [JKX18] announced at Eucrypto '18. However, this technique requires communication overhead of at least two rounds. In other words, the two rounds need to be considered the minimum bound that has been less likely to solve at this moment.

Patent Literature is Korean Patent No. 10-0398161.

SUMMARY

The invention is to solve the above-described problems, and its purpose is to provide an asymmetric password-based authenticated key agreement method with resilience to pre-computation attacks and with communication round efficiency. One of the embodiments of the invention provides the asymmetric password-based authentication and key sharing method with resilience to pre-computation attacks and with the communication round optimized for one round.

The object of the invention is not limited to the object mentioned above, and other objects not described will be clearly understood by those skilled in the art from the description below.

To achieve this purpose, the invention relates to an one-round password-based authentication and key sharing method with resilience to pre-computation attacks and with communication round efficiency. The method includes: allowing a client to generate a first hash key, a second hash key, and a random number exponent that is a private salt by using a public parameter and a password and to register password (PW)-authentication value information including a commitment value generated by the first hash key, the second hash key, and the random number exponent in a server; allowing the client to generate the second hash key by using the password, to generate a client random number exponent, to generate a client temporary public key by using the second hash key and the client random number exponent, and to deliver the client temporary public key to the server; allowing the server to generate a server random number exponent, to generate a ciphertext of a server temporary public key by using the server random number exponent and the PW-authentication value information, and to deliver the ciphertext to the client; allowing the client to generate the first hash key by using the password, to decrypt the ciphertext, and to acquire the server temporary public key; allowing the client to generate the temporary common key by using the server temporary public key and the client random number exponent; and allowing the server to generate the temporary common key by using the client temporary public key and the server random number exponent.

In the step of registering the PW-authentication value information in the server, the client may deliver the PW-authentication value information to the server through the security channel.

Before the step of registering the PW-authentication value information in the server, the step of the client and the server generating the public parameter may further be included.

Before the step of registering the PW-authentication value information in the server, the step of the client generating the password may further be included.

In one embodiment of the invention, an one-round password-based authentication and key sharing method, the method includes: allowing a client to generate a first hash key, a second hash key, and a random number exponent as a private salt by using a public parameter and a password and register the PW-authentication value information including a commitment value generated by using the first hash key, the second hash key, and the random number exponent in a server; allowing the client to generate the second hash key by using the password, generate the client random number exponent, generate the client temporary public key by using the second hash key and the client random number exponent, and deliver the client temporary public key to the server; allowing the client to generate the first hash key by using the password, decrypt the ciphertext, and acquire the server temporary public key; and allowing the client to generate the temporary common key by using the server temporary public key and the client random number exponent. In the step of registering the PW-authentication value information in the server, the client may deliver the PW-authentication value information to the server through the security channel.

Before the step of registering the PW-authentication value information in the server, the step of the client generating the public parameter may further be included Before the step of registering the PW-authentication value information in the server, the step of the client generating the password may further be included.

In one embodiment of the invention, in an one-round password-based authentication and key sharing method, the method includes: in a server allowing a client to generate a first hash key, a second hash key, and a random number exponent that is a private salt by using a public parameter and a password and to receive the PW-authentication value information including a commitment value generated by the first hash key, the second hash key, and the random number exponent; in the server allowing the client to generate the second hash key by using the password, to generate a client random number exponent, to generate a client temporary public key by using the second hash key and the client random number exponent, and to receive the client temporary public key; allowing the server to generate a server random number exponent, to generate a ciphertext of a server temporary public key by using the server random number exponent and the PW-authentication value information, and to deliver the ciphertext to the client; and allowing the server to generate the temporary common key by using the client temporary public key and the server random number exponent.

Before the step of receiving the PW-authentication value information from the server, the step of the server generating the public parameter may further be included.

The invention secures communication round efficiency through the asymmetric password-based authenticated key agreement method with resilience to pre-computation attacks, can be used as a core technology for configuring a very important communication security channel in the entire ICT industry, and has the effect capable of greatly improving network availability while providing user-friendly and convenient authentication in various industrial fields such as IoT.

BRIEF DESCRIPTION OF THE DRAWINGS

FIG. 3 is a diagram illustrating a specific process password-based authenticated key of the asymmetric agreement method with resilience to pre-computation attacks and with communication round efficiency according to the embodiment of the invention.

DETAILED DESCRIPTION

Figure 1:
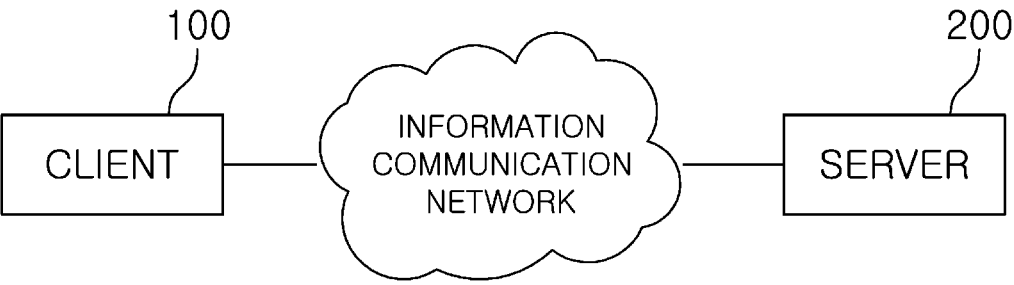
FIG. 1 conceptually illustrates an asymmetric password-based authenticated key agreement system according to an embodiment of the invention.

Since the invention can make various changes and have various embodiments, specific embodiments are to be illustrated and described in detail in the drawings. However, this is not intended to limit this invention to specific embodiments, and should be understood as including all changes, equivalents, or substitutes included in the spirit and technical scope of the invention. The terms used in this application are only used to describe specific embodiments and are not intended to limit the invention. Singular expressions include a plurality of expressions unless the context clearly dictates otherwise. In this application, terms such as "comprise" or "have" are intended to designate the presence of features, numbers, steps, operations, components, parts, or combinations thereof described in the specification, but are not intended to indicate the presence of one or more other features. It should be understood that this does not exclude in advance the possibility of the existence or addition of elements, numbers, steps, operations, components, parts, or combinations thereof.

Unless otherwise defined, all terms used herein, including technical or scientific terms, have the same meaning as those generally understood by those skilled in the art to which the present invention belongs. Terms such as those defined in commonly used dictionaries should be interpreted as having meanings consistent with the contextual meanings of the relevant technology and are not interpreted as ideal or excessively formal unless explicitly defined in this application.

In addition, in describing with reference to the accompanying drawings, the same components will be assigned the same reference numerals regardless of the reference numerals, and duplicate descriptions thereof will be omitted. In describing the invention, when it is determined that the detailed description of related known technologies may unnecessarily obscure the spirit of the invention, the detailed description will be omitted.

In one embodiment of the invention, in an one-round password-based authentication and key sharing method with resilience to pre-computation attacks and with communication round efficiency. The method includes: allowing a client to generate a first hash key, a second hash key, and a random number exponent that is a private salt by using a public parameter and a password and to register the PW-authentication value information including a commitment value generated by the first hash key, the second hash key, and the random number exponent in a server; allowing the client to generate the second hash key by using the password, to generate a client random number exponent, to generate a client temporary public key by using the second hash key and the client random number exponent, and to deliver the client temporary public key to the server; allowing the server to generate a server random number exponent, to generate a ciphertext of a server temporary public key by using the server random number exponent and the PW-authentication value information, and to deliver the ciphertext to the client; allowing the client to generate the first hash key by using the password, to decrypt the ciphertext, and to acquire the server temporary public key; allowing the client to generate the temporary common key by using the server temporary public key and the client random number exponent; and allowing the server to generate the temporary common key by using the client temporary public key and the server random number exponent.

In the step of registering the PW-authentication value information in the server, the client may deliver the PW-authentication value information to the server through the security channel.

Before the step of registering the PW-authentication value information in the server, the step of the client and the server generating the public parameter may further be included.

Before the step of registering the PW-authentication value information in the server, the step of the client generating the password may further be included.

In one embodiment of the invention, in an one-round password-based authentication and key sharing method, the method includes: allowing a client to generate a first hash key, a second hash key, and a random number exponent as a private salt by using a public parameter and a password and register the PW-authentication value information including a commitment value generated by using the first hash key, the second hash key, and the random number exponent in a server; allowing the client to generate the second hash key by using the password, generate the client random number exponent, generate the client temporary public key by using the second hash key and the client random number exponent, and deliver the client temporary public key to the server; allowing the client to generate the first hash key by using the password, decrypt the ciphertext, and acquire the server temporary public key; and allowing the client to generate the temporary common key by using the server temporary public key and the client random number exponent.

In the step of registering the PW-authentication value information in the server, the client may deliver the PW-authentication value information to the server through the security channel.

Before the step of registering the PW-authentication value information in the server, the step of the client generating the public parameter may further be included.

Before the step of registering the PW-authentication value information in the server, the step of the client generating the password may further be included.

In one embodiment of the invention, an one-round password-based authentication and key sharing method includes: in a server allowing a client to generate a first hash key, a second hash key, and a random number exponent that is a private salt by using a public parameter and a password and to receive the PW-authentication value information including a commitment value generated by the first hash key, the second hash key, and the random number exponent; in the server allowing the client to generate the second hash key by using the password, to generate a client random number exponent, to generate a client temporary public key by using the second hash key and the client random number exponent, and to receive the client temporary public key; allowing the server to generate a server random number exponent, to generate a ciphertext of a server temporary public key by using the server random number exponent and the PW-authentication value information, and to deliver the ciphertext to the client; and allowing the server to generate the temporary common key by using the client temporary public key and the server random number exponent.

Before the step of receiving the PW-authentication value information from the server, the step of the server generating the public parameter may further be included.

FIG. 1 conceptually illustrates an asymmetric password-based authenticated key agreement system according to one embodiment of the invention.

FIG. 1 is a block diagram illustrating a client and a server performing the asymmetric password-based authenticated key agreement method with resilience to pre-computation attacks and with communication round efficiency according to the embodiment of the invention.

Referring to FIG. 1, the client 100 and the server 200 may be user devices executing an asymmetric password-based authenticated key agreement method with resilience to pre-computation attacks and with communication round efficiency according to the embodiment of the invention. The client 100 and server 200 may be service providers or service consumers. The client 100 and the server 200 may include at least one module (not illustrated) that executes the algorithm or protocol that outputs the specific value for the given input value.

Figure 2:
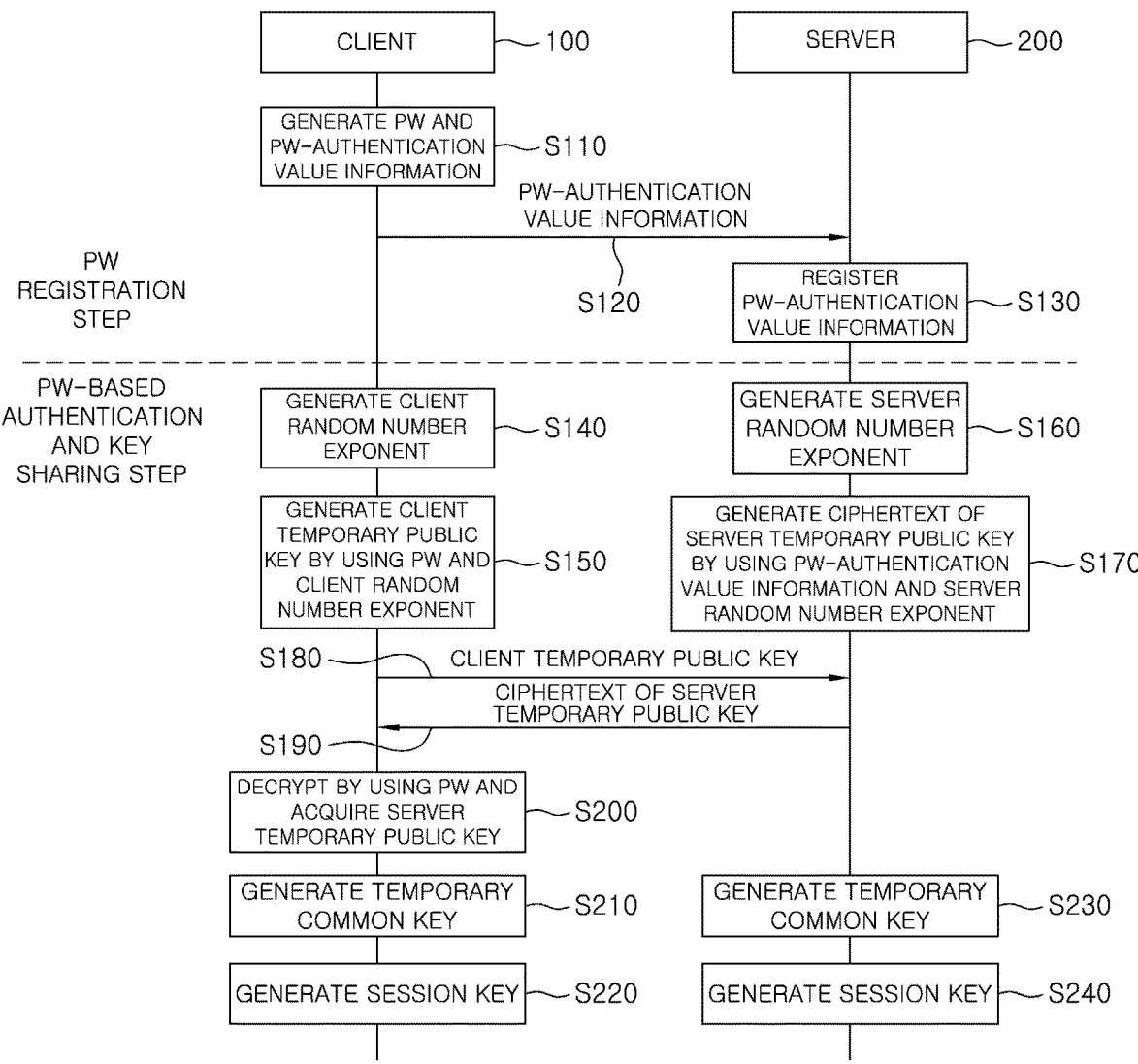
FIG. 2 is a flowchart illustrating an asymmetric password-based authenticated key agreement method with resilience to pre-computation attacks and with communication round efficiency according to the embodiment of the invention.

FIG. 2 is a flowchart illustrating the asymmetric password-based authenticated key agreement method with resilience to pre-computation attacks and with communication round efficiency according to the embodiment of the invention, and FIG. 3 is a flowchart illustrating a specific process of the asymmetric password-based authenticated key agreement method with resilience to pre-computation attacks and with communication round efficiency according to the embodiment of the invention.

In FIG. 3, C is an identifier representing the client, and S is an identifier representing the server. Discrete logarithmic parameters G, q, and g used as public parameters are assumed to be defined in advance. For example, G represents an algebraic group of which order is q, and g can be defined as a generation source of G. q can be defined as a prime number. For convenience, group operations are expressed in multiplication form. And, $Z_q$ is represented by a set $\{0, 1, \ldots, q-1\}$, and $Z_q^*$ is represented by the set $\{1, \ldots, q-1\}$.

In the embodiment of the invention, hash functions $H1:\{0, 1\}^* \to Z_q^*$, $H2:\{0,1\}^* \to G$, $H3:\{0, 1\}^* \to \{0, 1\}$ with cryptographic robustness L can be used, but is not limited to this, and the hash function can be understood as a function that converts an arbitrary bit string into elements of a mathematical group such as a fixed L-bit string or an algebraic group. For example, a hash function H2 can be any one of various functions such as a function defined in ISO/IEC 11770-4, $H2(m)=g_0^{H1(m)}$ generated by using a generation source $g_0$ different from a generation source g and a hash function H1, and $H2(m)=g1g2^{H1(m)}$ generated by using two other generation sources $g_1$ and $g_2$ different from the generation source g and the hash function H1.

Referring to FIG. 2, the client 100 generates a random number exponent that is a first hash key, a second hash key, and a private salt by using public parameters and passwords, and the PW-authentication value information including a commitment value generated by using the first hash key, the second hash key, the random number exponent is registered in the server 200 (S110, S120, S130).

Then, the client 100 generates the second hash key by using the password and generates a client random number exponent (S140). Then, the client temporary public key is generated by using the second hash key and the client random number exponent (S150), and the client temporary public key is delivered to the server 200 (S180).

The server 200 generates the server random number exponent (S160) and generates the ciphertext of the server temporary public key by using the server random number exponent and the PW-authentication value information (S170). Then, the ciphertext of the server temporary public key is delivered to the client 100 (S190).

The client 100 generates the first hash key by using the password, decrypts the ciphertext, and acquires the server temporary public key (S200).

Then, the client 100 generates the temporary common key by using the server temporary public key and the client random number exponent (S210).

The server 200 generates the temporary common key by using the client temporary public key and the server random number exponent (S230).

In one embodiment of the invention, in steps S110 to S130, the client 100 may deliver the PW-authentication value information to the server 200 through the security channel.

In one embodiment of the invention, before the step S110, the step of the client 100 and the server 200 generating the public parameter may be performed.

In one embodiment of the invention, before the step S110, the step of the client 100 generating the password may be performed.

Referring to FIGS. 2 and 3, first, the client 100 may register a password file or PW-authentication value information in the server 200 (S110, S120, S130). The PW-authentication value information includes a first hash key ($H1(pw)=\pi$), a second hash key ($H2(pw)=h_c$) generated by using the password (PW) of the client 100, and a commitment value ($V=h_c^\alpha g^{\beta\pi}$) generated by using the random number exponents $\alpha$ and $\beta$.

The random number exponent used to generate the commitment value (V) serves as the private salt and provides robustness against pre-computation attacks. Rather than using both random number indices $\alpha$ and $\beta$, one random number exponent can be used. For example, if only $\beta$ is used, the commitment value can be of the form $V=h_c g^{\beta\pi}$. In this case, instead of the random number exponent $\beta$, the group element $\mu=g^\beta$ can be included and stored in the PW-authentication value information. Alternatively, several random number exponents can be used depending on the structure of the second hash key.

In order to register the PW-authentication value information, the client 100 may select and input the password from the user in advance according to the predetermined policy.

The client 100 can maintain the security of password registration by delivering the PW-authentication value information to the server 200 by using the separate security channel.

The client 100 may generate the random number exponent ($\chi \in Z_q^*$) (S140).

The client 100 can generate the second hash key ($H2(pw)=h_c$), which is the element of the algebraic group by using the input password pw and can generate the client temporary public key ($A=h_c^x \in G$) by using the random number exponent ($\chi \in Z_q^*$) (S150).

The server 200 may generate the random number exponent ($y \in Z_q^*$) (S160).

The server 200 can generate the ciphertext ($B_1=V^y=h_c^{\alpha y} g^{\beta\pi y}$, $B_2=g^{\beta y}$) of the server temporary public key ($h_c^{\alpha y}$) by using the commitment value ($V=h_c^\alpha g^{\beta\pi}$), private salt random number exponent $\beta$, and the server random number exponent (y) among the PW-authentication value information (S170). If the group element $\mu=g^\beta$ is used instead of the random number exponent $\beta$, $B_2=g^{\beta y}$ in the ciphertext can be generated as $B_2=\mu^y(=g^{\beta y})$.

The client 100 may deliver the client temporary public key (A) to the server 200 (S180).

The server 200 may deliver the ciphertext ($B_1$, $B_2$) of the server temporary public key to the client 100 (S190).

The client 100 generates the first hash key ($H1(pw)=x$) by using the input password pw, decrypts the ciphertext ($B_1$, $B_2$) ($B=B_1 B_2^{-\pi}$), and generates the server temporary public key ($B=h_c^{\alpha y} \in G$) can be generated (S200).

The client 100 can generate the temporary common key ($K=B^x=h_c^{\alpha xy} \in G$) by using the server temporary public key ($B=h_c^{\alpha y} \in G$) (S210).

The client 100 may generate a session key (ask) by using the temporary common key (K) (S220). The client 100 calculates the third hash key by using the temporary common key (K), the identifiers (C, S) of the client and the server, and the protocol public record information (A, $B_1$, $B_2$) to generate the session key (ask=H3) (K, C, S, A, $B_1$, $B_2$)).

The server 200 may generate the temporary common key ($K=A^{\alpha y}=c_{hi}{}^{\alpha y}\in G$) by using the client temporary public key (A) (S230).

The server 200 may generate the session key (ask) by using the temporary common key (K) (S240). The server 200 calculates the third hash key by using the temporary common key (K), the identifiers (C, S) of the client and server, and the protocol public record information (A, $B_1$, $B_2$) to generate the session key (ask=H3) (K, C, S, A, $B_1$, $B_2$)).

The communication round is very important and fundamental criterion element in the performance of password-based authentication and key sharing cryptographic protocols. The invention provides the password-based authentication and key sharing method with resilience to pre-computation attacks and can operate in just one optimized communication round.

Figure 4:
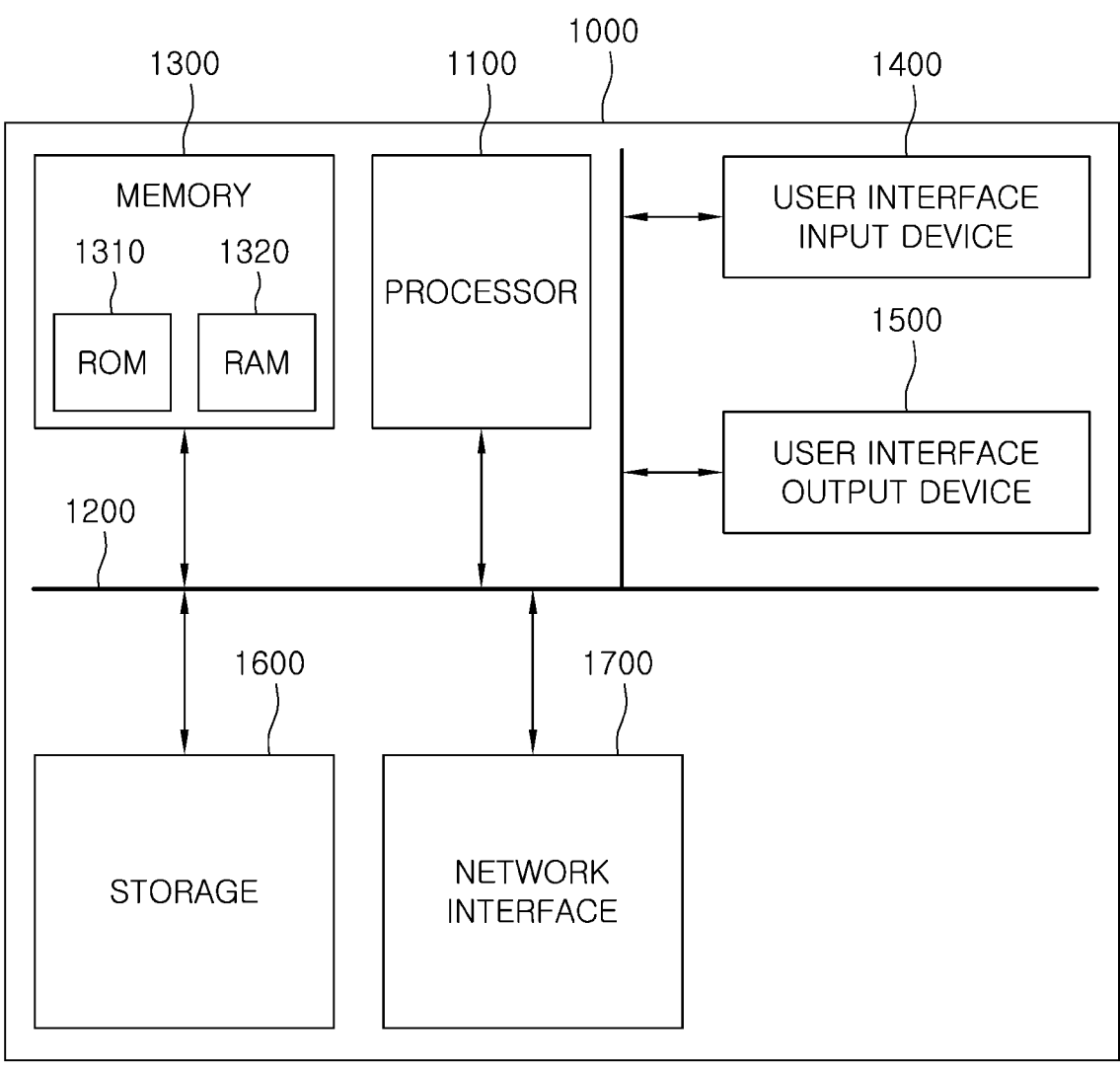
FIG. 4 is a block diagram illustrating a computing system implementing the asymmetric password-based authenticated key agreement method with resilience to pre-computation attacks and with communication round efficiency according to the embodiment of the invention.

FIG. 4 is a block diagram illustrating a computing system implementing the asymmetric password-based authenticated key agreement method with resilience to pre-computation attacks and with communication round efficiency according to the embodiment of the invention.

Referring to FIG. 4, the computing system 1000 includes at least one processor 1100, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and the storage 1600. The memory 1300 and the storage 1600 may include various types of volatile or non-volatile storage media. For example, the memory 1300 may include a read only memory (ROM) and a random access memory (RAM).

Accordingly, the steps of the method or algorithm described in connection with the embodiments disclosed in the specification may be implemented directly in hardware, software modules, r a combination of the two of the hardware and software modules executed by the processor 1100. Software modules may reside in the storage medium (that is, the memory 1300), such as a RAM memory, a flash memory, a ROM memory, an EPROM memory, an EPSOM memory, a register, a hard disk, a removable disk, or a CD-ROM and the storage 1600. An exemplary storage medium is coupled to the processor 1100. The processor 1100 can read information from the storage medium and write information to the storage medium. Alternatively, the storage medium may be integrated with the processor 1100. The processor and the storage medium may reside in an application specific integrated circuit (ASIC). The ASIC may reside in a user terminal. Alternatively, the processor and the storage medium may reside as separate components within the user terminal.

The above description is merely the illustrative explanation of the technical idea of the invention, and various modifications and variations will be able to those skilled in the art without departing from the essential characteristics of the invention.

Accordingly, the embodiments disclosed in the invention are not intended to limit the technical idea of the invention, but are for illustrative purposes, and the scope of the technical idea of the invention is not limited by these embodiments. The scope of protection of the invention should be interpreted in accordance with the claims below, and all technical ideas within the equivalent scope should be construed as being included in the scope of the invention.

The invention described above by using several preferred embodiment, but these embodiments are illustrative and not limited. Those of ordinary skilled in the technical field to which the invention belongs will understand that various changes and modifications can be made without departing from the spirit of the invention and the scope of rights set forth in the appended claims.

What is claimed is:

1. A one-round password-based authentication and key sharing method, comprising:

generating, via a client, a first hash key, a second hash key, and a random number exponent that is a private salt by using a public parameter and a password and registering PW-authentication value information including a commitment value generated by the first hash key, the second hash key, and the random number exponent in a server;

generating, via the client, the second hash key by using the password, generating a client random number exponent, generating a client temporary public key by using the second hash key and the client random number exponent, and delivering via the client, the client temporary public key to the server;

generating, via the server, a server random number exponent, generating a ciphertext of a server temporary public key by using the server random number exponent and the PW-authentication value information, and delivering, via the server, the ciphertext to the client;

generating, via the client, the first hash key by using the password, decrypting the ciphertext, and acquiring, via the client, the server temporary public key;

generating via the client, a temporary common key by using the server temporary public key and the client random number exponent; and generating, via the server, the temporary common key by using the client temporary public key and the server random number exponent.

2. The one-round password-based authentication and key sharing method according to claim 1, wherein, in the registering the PW-authentication value information in the server, the client delivers the PW-authentication value information to the server through a security channel.

3. The one-round password-based authentication and key sharing method according to claim 1, further comprising, before registering the PW-authentication value information in the server, generating via the client and the server, the public parameter.

4. The one-round password-based authentication and key sharing method according to claim 1, further comprising, before registering the PW-authentication value information on the server, generating, via the client-to-generate, the password.

5. A one-round password-based authentication and key sharing method comprising:

generating, via a client, a first hash key, a second hash key, and a random number exponent as a private salt by using a public parameter and a password and registering PW-authentication value information including a commitment value generated by using the first hash key, the second hash key, and the random number exponent in a server;

generating, via the client, the second hash key by using the password, generating a client random number exponent, generating a client temporary public key by using the second hash key and the client random number exponent, and delivering the client temporary public key to the server;

generating, via the client, the first hash key by using the password, decrypting a ciphertext, and acquiring a server temporary public key; and generating, via the client, a temporary common key by using the server temporary public key and the client random number exponent.

6. The one-round password-based authentication and key sharing method according to claim 5, wherein, in the registering the PW-authentication value information on the server, the client delivers the PW-authentication value information to the server through a security channel.

7. The one-round password-based authentication and key sharing method according to claim 5, further comprising, before registering the PW-authentication value information in the server, generating, via the client, the public parameter.

8. The one-round password-based authentication and key sharing method according to claim 5, further comprising, before registering the PW-authentication value information in the server, generating, via the client, the password.

9. A one-round password-based authentication and key sharing method performed by a server, the method comprising:

receiving PW-authentication value information including a commitment value generated by a client using a first hash key, a second hash key, and a random number exponent that is a private salt by using a public parameter and a password;

receiving a client temporary public key generated by the client using the second hash key and a client random number exponent;

generating a server random number exponent, generating a ciphertext of a server temporary public key by using the server random number exponent and the PW-authentication value information, and delivering the ciphertext to the client; and generating a temporary common key by using the client temporary public key and the server random number exponent.

10. The one-round password-based authentication and key sharing method according to claim 9, further comprising, before receiving the PW-authentication value information, generating the public parameter.

11. A server for performing one-round password-based authentication and key sharing, the server comprising:

memory storing a program or at least one instruction; and at least one processor, wherein the at least one instruction, when executed by the at least one processor, causes the server to:

receive PW-authentication value information including a commitment value generated by a client using a first hash key, a second hash key, and a random number exponent that is a private salt by using a public parameter and a password;

receive a client temporary public key generated by the client using the second hash key and a client random number exponent;

generate a server random number exponent, generate a ciphertext of a server temporary public key by using the server random number exponent and the PW-authentication value information, and deliver the ciphertext to the client; and generate a temporary common key by using the client temporary public key and the server random number exponent.

* * * * *